April 4, 1933.   W. B. MITCHELL   1,903,341
COMBINATION SLIDING SUBBASE AND SCRAPER FOR AUTO JACKS
Filed March 16, 1932
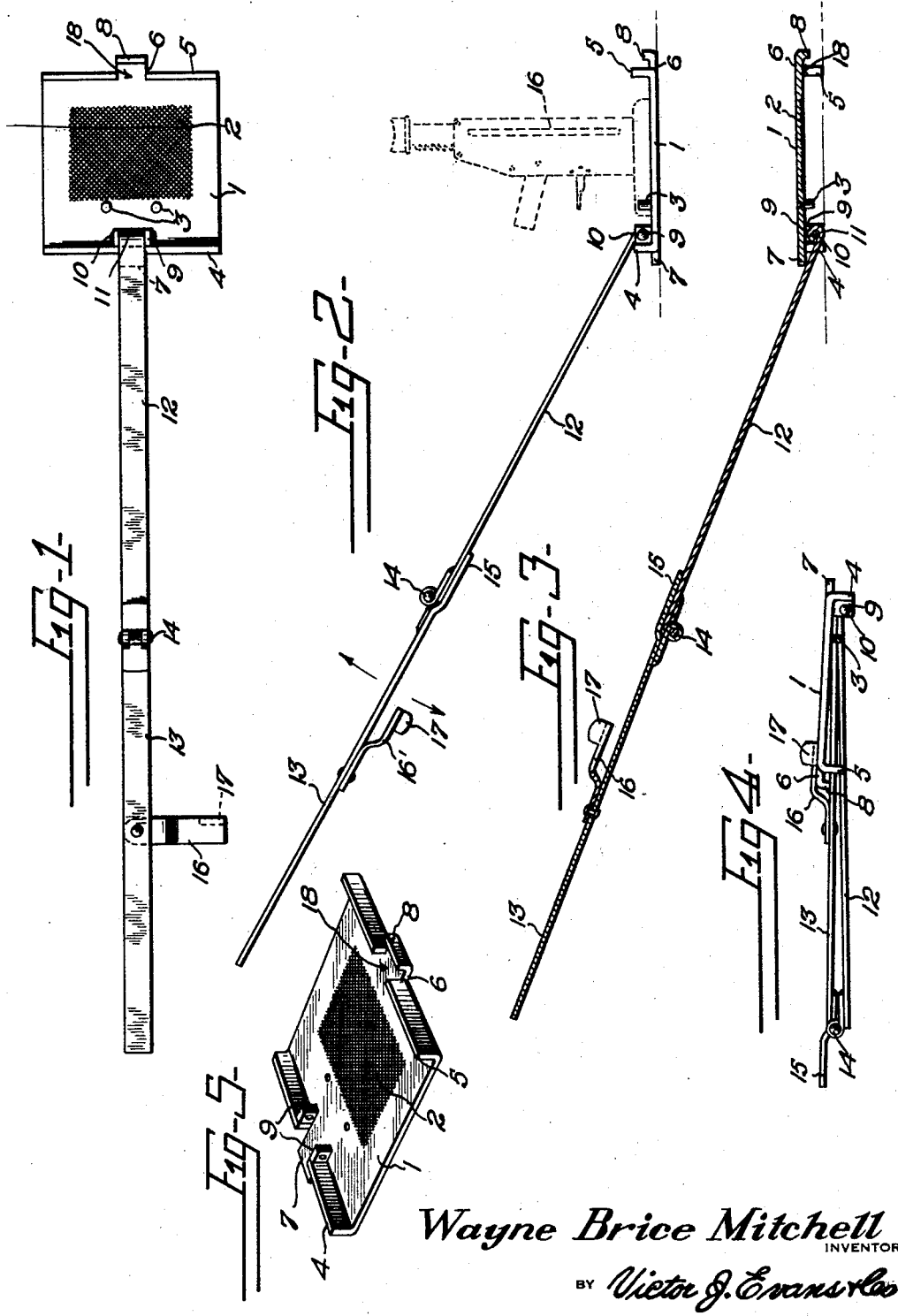
Wayne Brice Mitchell
INVENTOR Patented Apr. 4, 1933

1,903,341

UNITED STATES PATENT OFFICE

WAYNE BRICE MITCHELL, OF QUEBEC, QUEBEC, CANADA

COMBINATION SLIDING SUBBASE AND SCRAPER FOR AUTO JACKS

Application filed March 16, 1932. Serial No. 599,267.

The object of this, my present invention, is the provision of a device in the nature of an accessory for automobiles.

The object of the invention is the provision of a device which is designed for employment as a scraper for leveling a road and as a support for effectively sustaining thereon a lifting jack when it is necessary that the tire on any of the wheels of an automobile be changed and further wherein the device when not required for use may be folded upon itself to provide a small package which may be easily stored under the seat or at any other convenient place in the automobile.

To the attainment of the foregoing the invention consists in the improvement hereinafter described and definitely claimed.

In the drawing:

Figure 1 is a plan view illustrating the device arranged to support a lifting jack thereon.

Figure 2 is a side elevation thereof.

Figure 3 is an approximately longitudinal sectional view thereof but illustrating the device employed as a scraper for leveling a roadbed.

Figure 4 is a side elevation of the device in collapsed or folded position.

Figure 5 is a perspective view of the body plate of the device.

As is well known to automobilists it is extremely difficult to obtain a firm purchase for a lifting jack, especially on dirt or macadamized roads and likewise incident to foreign matters, such as grease, grime, etc., it is difficult to obtain such purchase on a concrete roadway. With my improvement it will be noted, as the description progresses that I have produced an extremely simple device for effectively scraping and leveling a roadway and for supporting a jack on such level surface so that the jack can be readily operated without liability of tilting or wobbling in elevating the body of an automobile for changing of a tire on any of the wheels thereof. The improvement essentially comprises a flat metal plate 1 which is both light and strong. The plate 1 has one of its faces centrally roughened, as at 2, and to one side of the roughened portion is provided with a pair of upstanding lugs 3. The opposite ends of the plate 1 are bent or flanged upwardly, as at 4 and 5, respectively. The flange 5 is arranged at the outer end of the plate, and this flange, as well as the flange 4 is centrally notched or cutaway and are provided with projections 6 and 7 that project from the said notched or cutaway portion of the improvement. The outer projection 6 has its end formed with an upwardly extending lip 8, while the extension 7 is flat throughout the length thereof. In a line with the central notched portion, the flange 4 and the plate 1 are provided with lugs 9. There is passed through these lugs a double-headed pivot 10 that also passes through the eye end 11 of the handle of the device. The handle is made up of two sections 12 and 13, respectively. The inner section 12 is provided with the eye 11, and the confronting ends of the handle sections 12 and 13 are connected together by a hinge 14. The outer section 12 of the handle, opposite the hinge, is offset and extended to afford a lip 15, and this lip is designed to be brought into contact with the under face of the section 12 when the plate 1 affords a support for a lifting jack disclosed by the dotted lines in Figure 2 of the drawing and indicated by the character 16. The base of the jack is preferably provided with openings to receive therein the lugs 3 and the base of the jack rests on the roughened surface 2 of the plate, 1. The jack is thus immovably supported upon the plate and the plate may be moved by the handle to arrange the jack directly beneath the rear or front axle of an automobile which is to be raised by the jack for the replacement of a tire. As previously stated, the road over which the vehicle travels, in most instances requires scraping and leveling before a jack can obtain a proper purchase thereagainst, and to accomplish this I reverse the device from a position disclosed by Figures 1 and 2 so that the flanges 4 and 5 will be arranged against a road surface and the lip 15 of the handle section 13 will be arranged over instead of under the handle section 12. By operating the handle to move the plate 1 backward and forward the flanges 4 and 5 effectively scrape the road surface to level the same so that when the device is turned to the position disclosed by Figures 1 and 2 the under and non-flanged face of the plate will rest upon such leveled surface and, as previously stated, effectively support the jack thereon.

Pivotally secured to the outer handle section 13 there is the offset end of a latch member 16'. The latch is provided with a finger grip 17, and when the handle is folded as disclosed by Figure 4 of the drawing the handle section 13 is swung over the handle section 12 and both of these sections are received through the notch 18 in the flange 5 of the plate, the handle section 13 resting on the lip 8 of the extension 6. The latch 16 is of spring metal and the same is now swung on its pivot to arrange the said latch over what I have termed the bottom of the plate 1. The device is now folded into a small compact package which can be readily received in a tool compartment, beneath the seat, or at any other convenient place in an automobile.

Having described the invention, I claim:

1. A device for the purpose described, comprising a platform having its front and rear ends flanged in the same direction and the said flanges being centrally notched, said plate having upstanding lugs adjacent the rear flange and having a roughened surface between the lugs and the front flange, a handle pivotally secured to the plate inward of the rear flange and swingable through the notches thereof, said handle comprising two hingedly supported sections, the outer section being formed with a lip extension to overlie the inner section, both handle sections, when swung together, designed to be received through the notch in the outer flange, and means carried by the outer handle section for latching the folded handles to the plate.

2. A device for the purpose set forth, comprising a flat plate having its inner and its outer ends flanged in the same direction and said flanges being centrally provided with alining notches and the plate having extensions which project from the notches and the outer extension having a lipped end, said plate having upstanding spaced lugs adjacent to the inner flange and having a roughened surface between the lugs and the outer flange, lugs on the inner flange alining with the notch therethrough, a handle comprising a flat bar which is pivotally secured between the last named lugs, said handle comprising two hingedly associated sections and the outer section having a lip extension to overlie the inner section when the handle sections are in a line, said sections, when swung against each other, designed to pass through the notch of the outer flange to have one of said sections rest on the lipped end of the outer extension, and a pivotally supported spring latch on the outer handle section swingable over the plate when the device is in collapsed condition.

In testimony whereof I affix my signature.

WAYNE BRICE MITCHELL.